United States Patent Office 3,531,163
Patented Sept. 29, 1970

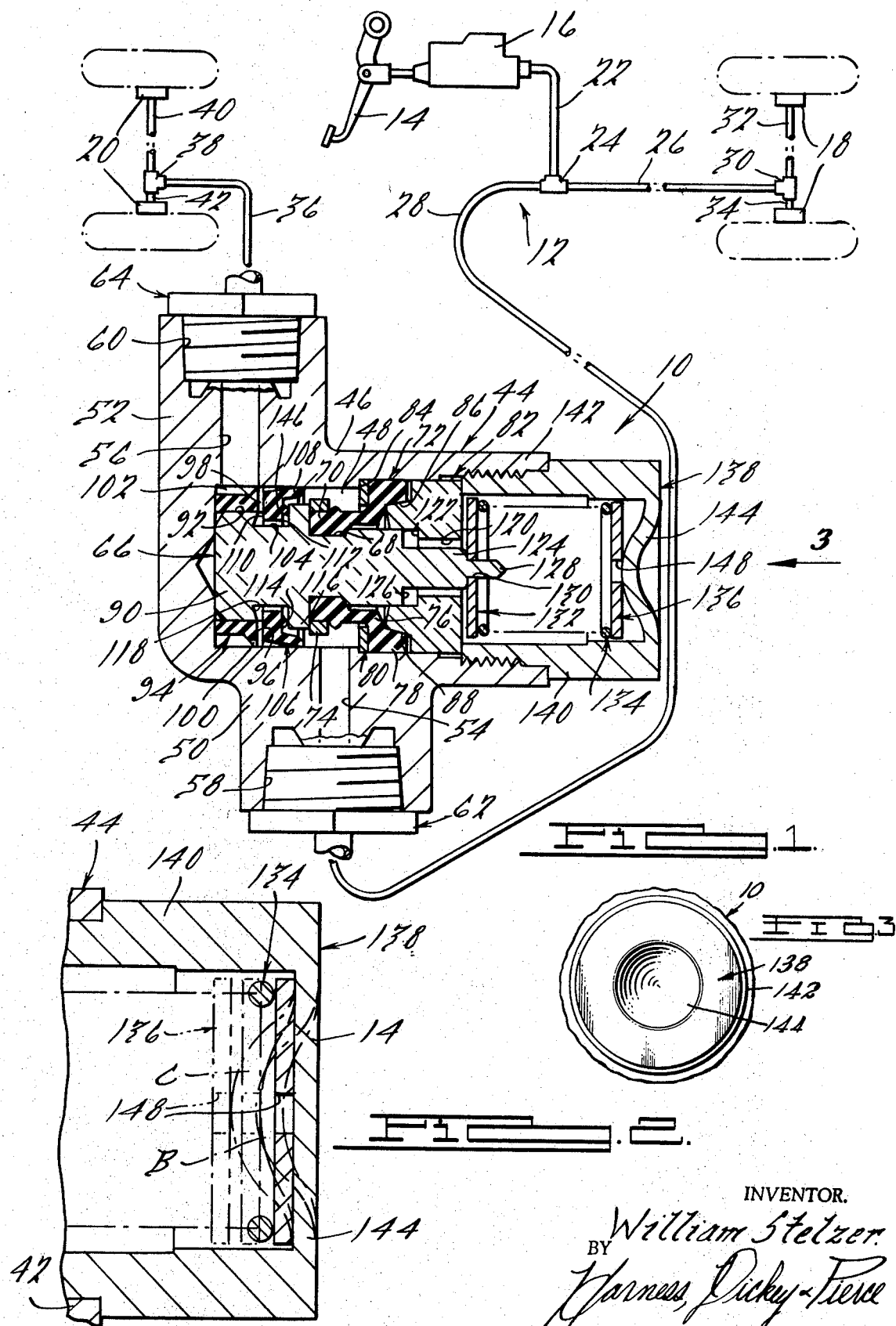

3,531,163
VALVE ASSEMBLY
William Stelzer, Milford, Mich., assignor to Kelsey-Hayes Company, Romulus, Mich., a corporation of Delaware
Filed Sept. 17, 1968, Ser. No. 760,263
Int. Cl. B60t 8/26
U.S. Cl. 303—6       1 Claim

ABSTRACT OF THE DISCLOSURE

A valve assembly including a valve housing defining an internal valve chamber having means therein defining a valve seat; a valve member disposed within the chamber; a valve spring disposed adjacent the valve member and adapted to resiliently bias the same toward engagement with the valve seat, and a deformable member arranged adjacent the end of the valve spring opposite the valve member and adapted to be selectively deformed interiorly of the housing and thereby compress the valve spring some predetermined amount so as to control the effective resilient force exerted by the spring against the valve member.

BACKGROUND OF THE INVENTION

It has heretofore commonly been the practice in the construction of fluid and other type valve assemblies to provide some type of resilient spring means for normally urging a valve or sealing member toward or away from an associated valve seat or the like, whereby to normally maintain the valve in an open or closed condition. It is frequently the case that valve springs of the above character must be selected so as to operate with high precision and accuracy in effecting opening and/or closing of the associated valve member. Such is the case in proportioning valves of the type that are commonly found in vehicular hydraulic braking systems and which function to control the flow of hydraulic braking fluid from the vehicle master cylinder to the front and rear wheel cylinders. Due to the high degree of precision required of many of such valve springs, the relative manufacturing costs thereof are carefully considered in the design of the overall valve assemblies, since the savings resulting from the use of even a slightly less expensive valve spring will usually effect a corresponding reduction in the total manufacturing expenses for the entire valve.

Generally speaking, the present invention is directed toward a new and improved valve assembly which may be manufactured at a somewhat lower cost than similar type valves heretofore known and used. More particularly, the present invention provides a valve construction which permits the use of valve springs that may be manufactured with considerably less precision than has heretofore been possible, without such springs detracting or adversely affecting the overall effectiveness or positive action of the associated valve assemblies. Thus, the present invention permits the use of less expensive valve springs while maintaining the high degree of performance required of the valve assemblies.

The principles of the present invention are featured and described in operative association with a typical vehicular proportioning valve of the aforementoned type, and although it is not at all necessary that the present invention be associated with this type of valve assembly, due to the fact that proportioning valves, by their very nature, demand effective and positive action, the principles of the present invention find particularly useful application therewith.

SUMMARY OF THE INVENTION

This invention relates generally to the valving art, and, more particularly, to a new and improved means for controlling or adjusting the effective resilient force exerted by a valve closure spring in biasing an associated valve member toward some preselected operative position.

It is accordingly a general object of the present invention to provide a new and improved valve construction.

It is a more particular object of the present invention to provide a new and improved method and apparatus for controlling the spring force of a valve spring, and which is adapted to find particularly useful application in proportioning valves of the type commonly found in vehicular hydraulic brake systems.

It is another object of the present invention to provide a new and improved valve construction of the type comprising a closure spring adapted to exert a resilient force against an associated valve member, and which includes a deformable member adjacent one end of the closure spring adapted to be selectively deformed to a position wherein one side thereof biases or compresses the spring some predetermined amount in order to control the effective resilient force exerted thereby in urging the valve member toward a preselected operative position.

It is a further object of the present invention to provide an apparatus of the above character wherein the deformable member may be provided in the form of a removable plug which may be threadably received within one end of the valve chamber within which the valve spring is operatively disposed.

It is still another object of the present invention to provide a new and improved method of the above character which obviates the need for precision selection of valve springs and permits the use of springs of greater tolerance deviations for fluid valving applications.

It is yet another object of the present invention to provide a new and improved method of the above character which includes the step of determining the amount of the deformation of the deformable member by sensing the fluid pressure required to effect movement of the associated valve member toward an open position.

Other objects and advantages of the present invention will become apparent from the following detailed description taken in conjunction with the accompanying drawing.

BRIEF DESCRIPTION OF THE DRAWING

FIG. 1 is a longitudinal cross sectional view through a proportioning valve embodying the principles of the present invention, with the valve being shown in operative association with a diagrammatically illustrated vehicular braking system, FIG. 2 is an enlarged fragmentary view of a portion of the valve illustrated in FIG. 1, with a deformable portion thereof shown in phantom in various preselected deformed portions; and FIG. 3 is an end elevational view, as taken in the direction of arrow 3 in FIG. 1.

DETAILED DESCRIPTION OF A PREFERRED EMBODIMENT

Referring now in detail to the drawing, a valve assembly 10, constructed in accordance with the principles of the present invention, is shown in operative association with a hydraulic vehicular braking system 12 comprising a conventional brake pedal 14, master cylinder 16 and front and rear wheel cylinders 18, 20, respectively. By way of example, the master cylinder 16 is connected through a suitable hydraulic fluid line or conduit 22 through a T-fitting 24 with hydraulic conduits 26 and 28, and the conduit 26 is connected through a suitable T-fitting 30 to conduits 32 and 34 which are communicable with the front wheel cylinders 18. The conduit 28 is communicable through the valve assembly 10 of the present invention with a suitable conduit 36 that is connected through a T-fitting 38 and conduits 40 and 42 to the rear wheel cylinders 20. As will hereinafter be described in detail, the valve assembly 10 is adapted to normally function in selectively controlling a flow of hydraulic fluid from the master cylinder 16 to the rear wheel cylinders 20, and thereby selectively control the relative braking characteristics of the front and rear wheel cylinders 18 and 20.

Referring now in detail to the construction of the valve assembly 10, as best seen in FIG. 1, said assembly comprises a valve housing 44 having a main body section 46 which defines an elongated cylindrical valve chamber 48 that is normally closed at one (right) end thereof in a manner later to be described. The housing 44 also comprises inlet and outlet sections 50 and 52 which are formed integrally of the main body section 46 and define internal hydraulic fluid passages 54 and 56 which are communicable at the inner ends with the interior of the chamber 48. The outer ends of the passages 54, 56 are formed with enlarged diameter counterbore sections 58 and 60 which are adapted to threadably receive suitable fluid fittings 62 and 64 that operatively secure the fluid conduits 28 and 36, respectively, to the housing 44.

Disposed within the valve chamber 48 of the housing 44 is a central push rod member, generally designated 66, which is formed with an annular, radially inwardly extending recessed portion 68 at a position intermediate the opposite ends thereof. The recessed portion 68 is adapted to operatively receive and support an annular inner mounting section 70 of an annular valve diaphragm member, generally designated by the numeral 72. The mounting section 70 is adapted to be positively sealingly engaged around the periphery of the recessed portion 68 by means of an annular diaphragm clamp 74 which extends around the periphery of the mounting section 70. The diaphragm 72 comprises a generally resilient, flexible intermediate section 76 which extends axially and radially outwardly from the inner mounting section 70 and terminates in an enlarged thickness outer mounting section 78 that is peripherally engaged with the side wall of the chamber 48. The outer mounting section 78 of the diaphragm 72 is adapted to be clampingly secured between a generally radially inwardly extending diaphragm washer 80 disposed on one (left) side of the section 78 and an annular diaphragm compression plug member 82 which is disposed on the opposite (right) side of the section 78. As illustrated, the washer 80 abuttingly engages a radially inwardly extending shoulder 84 formed around the periphery of the chamber 48, and the mounting section 78 and plug 82 are formed with complementary radially and axially inclined or tapered surfaces 86 and 88, respectively, whereupon axial movement of the plug 82 toward the left in FIG. 1, will result in the mounting section 78 being compressed between the washer 80 and plug 82 and sealingly engaged with the periphery of the chamber 48. As will later be described, the means for closing the adjacent end of the chamber 48 will function to operatively maintain the plug 82 in the position shown in FIG. 1 and thereby assure a fluid tight seal between the outer periphery of the diaphragm 72 and the periphery of the chamber 48. By virtue of the flexible intermediate section 76 of the diaphragm 72, it will be seen that the push rod member 66 may move axially toward the right in FIG. 1, while a positive fluid seal is maintained between the outer periphery of the member 66 and the peripheral wall of the chamber 48.

The end of the push rod 66 adjacent the outlet section 52 of the housing 44 is formed with a generally cylindrical-shaped section 90 which defines a cylindrical side wall 92. Disposed radially outwardly from the side wall is an annular or ring-shaped valve member, generally designated 94. The valve member 94 is formed with a plurality of circumferentially spaced axially extending projections 96 which define a plurality of radially disposed, circumferentially spaced grooves 98 therebetween. The projections 96 extend radially outwardly from the member 94 to a position directly adjacent the side wall of the chamber 48 and also define a plurality of axially extending circumferentially spaced recessed portions 100. As shown, the valve member 94 together with the side wall of the chamber 48 defines an annular space 102 which is communicable with the passage 56 and through the recesses 100 with the grooves 98.

The portion of the push rod 66 directly to the right of the cylindrical section 90 is formed with a radially inwardly extending annular recess 104 which is adapted to operatively receive the radially innermost portion of an annular or ring-shaped valve seal, generally designated 106. The valve seal 106 is preferably fabricated of a resilient material, such as a hydraulic fluid impervious rubber or the like, and is formed with a radially inwardly inclined flange or lip section 108 that is dimensioned so as to peripherally and sealingly engage the side wall of the annular chamber 48. It will be seen that the valve seal 106 comprises a pair of axially spaced, radially extending side surfaces 110 and 112, the former of which is adapted to abuttingly engage the projections 96, and the latter of which is formed with a plurality of circumferentially spaced embossments 114 which are adapted to engage a radially outwardly extending shoulder section 116 defined between the annular recess 104 and recessed portion 68 of the push rod member 66. The flange section 108 of the valve seal 106 is spaced radially outwardly from the radial extremity of the shoulder section 116, and the embossments 114 define a plurality of circumferentially spaced fluid passages (not shown) therebetween which communicate the portion of the annular chamber 48 adjacent the fluid passage 54 with the radially extending circumferentially spaced grooves 98. Thus, it will be seen that when the above described components of the valve assembly 10 are disposed in their respective operative positions shown in FIG. 1, fluid communication is provided from the conduit 28, through the passage 54, chamber 48, between the embossments 114, through the grooves 98, annular space 102 and fluid passage 56 with the conduit 36.

As illustrated in FIG. 1, the annular recess 104 defines a valve seat or surface 118 which extends radially outwardly around the push rod 66 and is adapted to engage the radially extending side surface 110 of the valve seal 106 upon axial movement of the push rod 66 toward the right in FIG. 1. It will be seen that when the valve seat 118 engages the surface 110, fluid communication between the annular space 102 and the annular area between the valve seal 106 and push rod 66 is blocked, thus preventing fluid from flowing from the passage 54 to the passage 56.

The compression plug member 82 is formed with a central annular opening 120 which defines a radially extending shoulder 122 along one side of the plug 82 and is adapted to slidably receive an axially extending section 124 of the push rod member 66. The section 124 of the member 66 terminates at the left side thereof in a radially outwardly extending shoulder 126 which is adapted to abuttingly engage the shoulder 122 upon axial movement of the push rod 66 toward the right in FIG. 1, and thereby limit such axial movement of the member 66. The axially outermost end of the push rod section 124 is formed with an axially extending guide pin portion 128 which extends through a central aperture 130 formed in a generally flat, disk-like washer member 132 that is disposed on the outer side of the compression plug member 82.

The member 132 is adapted to abuttingly engage the inner end of a helical or coil valve spring, generally designated 134, which is arranged coaxially of the push rod 66. The opposite or outer end of the valve spring 134 is adapted to abuttingly engage the inner side of a flat, disk-like pressure plate 136 which is similar in construction and shape to the member 132 and is arranged coaxially thereof. The valve spring 134, member 132 and pressure plate 136 are adapted to be housed within a generally cup-shaped closure member or end plug, generally designated 138, which comprises an annular side wall section 140 adapted to threadably engage a suitable internally threaded portion 142 formed at the end of the main body section 46 of the valve housing 44. The end plug 138 also comprises a generally radially extending end section 144 which is adapted to function in a manner hereinafter to be described in cooperating with the pressure plate 136 and valve spring 134 in controlling operative movement of the push rod 66 toward the position illustrated in FIG. 1 during the operational cycle of the valve assembly 10 of the present invention.

In general, operation of the valve assembly 10 is as follows: The various component parts of the assembly 10 normally assume the positions shown in FIG. 1 when the brake pedal 14 is released. At such time as the brakes of the associated vehicle are applied, the pedal 14 is depressed to operate the master cylinder 16 in a conventional manner, with the result that hydraulic braking fluid will flow from the cylinder 16 to the front wheel cylinders 18 through the conduits 22, 26, 32 and 34. Simultaneously, fluid will flow through the conduit 28 into the passage 54 and into the valve chamber 48. Thereafter, this fluid will flow through the area defined by the circumferentially spaced embossments 114 and through the grooves 98 into the annular space 102. This fluid will finally then flow through the passage 56 and conduits 36, 40 and 42 into the rear wheel cylinders 20. Thus, initially, all of the wheel cylinders 18, 20 are communicable with the source of fluid pressure provided by the master cylinder 16, and the brake cylinder pressures at both the front and rear wheels will increase simultaneously and at the same ratio. At such time as the fluid pressure in the rear wheel cylinders 20 reaches a preselected level, the generated pressure, communicated to the annular area defined by the radial side surface 146 of the shoulder section 116, functions to bias the push rod member 66 toward the right in FIG. 1 against the resistance of the valve spring 134, with the result that the valve seat 118 will be biased into engagement with the side surface 110 of the valve seal 106, thus blocking communication between the conduits 28 and 36. No additional hydraulic fluid will be supplied to the rear wheel cylinders 20, except as indicated below.

Further depression of the brake pedal 14 results in an increase in pressure in the valve chamber 48, which pressure acts on the area of the portion of the valve seat 118 located radially inwardly from the inner periphery of the valve seal 106. This increase in pressure, assisted by the valve spring 134, effects axial movement of the push rod 66 toward the left in FIG. 1, whereby to move the valve seat 118 out of engagement with the side surface 110 of the valve seal 106, to allow a further flow of hydraulic fluid from the valve chamber 48 into the passage 56 and conduits 36, 40 and 42 to the rear wheel cylinders 20 until a pressure balance is established again between the front and rear wheel cylinders 18, 20, respectively. This rate of flow of fluid, when the push rod 66 is in the position shown in FIG. 1, depends upon the increased pressure in the master cylinder 16, and the increase of pressure in the rear wheel cylinders 20 will thus be proportional to the front wheel cylinder pressures. The pressure ratio between the front and rear cylinders follows a predetermined and fixed curve, depending upon the ratio of pressure surfaces controlling reciprocable movement of the push rod 66 within the valve assembly 10 in a manner well known in the art and described, for example, in U.S. Pat. No. 3,258,924, for Vehicle Braking Mechanism, issued July 5, 1966, and assigned to the assignee of the present application, which description is incorporated herein by reference as a descriptive portion of this application.

As will be readily apparent to the skilled artisan, it is extremely important for effective and positive operation of the valve assembly 10 that the valve spring 134 be accurately calibrated and dimensioned such that the push rod 66 will be positively urged thereby to a position opening or separating the valve seat 118 from the side surface 110 of the valve seal 106 during operation of the assembly 10. Heretofore, it has been necessary to provide valve assemblies, such as the assembly 10, with valve springs which are extremely accurate and which are manufactured with considerable precision in order to assure such positive action, with the result that these valve springs have been relatively expensive, a feature which has been particularly objectionable when the associated valve assemblies are manufactured on a mass production basis, such as is the case with proportioning valves of the type provided with vehicular braking systems. In order to overcome this objectionable characteristic resulting from the need of providing the valve assembly 10 with a precision and hence expensive valve spring, the assembly 10 of the present invention is provide with a new and improved feature which permits the use of a less accurate and thus less expensive valve spring therewithin, yet does not detract from the effective and positive action of the assembly 10, as will hereinatfer be described in detail.

In accordance with the principles of the present invention, the end section 144 of the end plug 138 is fabricated of a deformable material and is thereby adapted to be subjected to a preselected axially inwardly directed force and be biased beyond its elastic limit (yield point), for example, from an initial flat or radially extending configuration, such as is shown by the position A in FIG. 2, to one or more relatively deformed positions shown at B and C in FIG. 2, and thereby effect a preselected amount of compression of the valve spring 134 within the end plug 138. With this arrangement, a valve spring, such as the spring 134, may be provided that is somewhat "oversize" or "undersize" within predetermined limits, in the axial dimension interjacent the washer members 132 and pressure plate 136. Thereafter, the central portion of the end section 144 of the end plug 138 may be depressed by a suitable tool, with the result that the end section 144 is biased axially inwardly from the position A in FIG. 2 to a deformed position such as one of the positions B, C or the like. As the end section 144 is thus deformed, the pressure plate 136 is biased, for example, from the solid line position in FIG. 2 to one of the phantom line positions, with the result that the valve spring 134 is compressed in the axial direction some predetermined amount, thereby changing the effective resilient force exerted by the spring 134 in urging the push rod 66 toward the position shown in FIG. 1. It will be apparent, of course, that the amount of deformation of the end section 144 will directly correspond to the desired degree of compression of the valve spring 134, and suitable calibration of the assembly 10 may be achieved, for example, by supplying fluid pressure to the assembly 10 of a predetermined magnitude and successively incrementally deforming the end section 144 until the valve spring 134 effects movement of the push rod 66 to the open position at said preselected pressure.

By virtue of the fact that the valve spring 134 may vary somewhat in the axial dimension, the spring 134 need not be manufactured with the precision control as has been required of similar type valve assemblies which have not been provided with the deformable end section or the like 144, with the result that a considerably less expensive spring may be used for the valve spring 134, thereby reducing the overall manufacturing costs of the valve assembly 10.

As seen in FIG. 1, the pressure plate 136 is provided with a central annular opening 148 which is adapted to be engaged by the centermost portion of the end section 144, which assumes a generally semispherical configuration upon deformation thereof, so as to maintain the pressure plate 136 centrally of the interior of the end plug 138. It will be noted that by virtue of the central orientation of the pressure plate 136, compression of the valve spring 134 upon deformation of the plug 138 is achieved uniformally around the entire periphery of the outer end of the valve spring 134.

In a preferred construction of the present invention, the end plug 138 is fabricated of a rigid, yet deformable material such as SAE 1020 or 1112 steel, with the thickness of the end section 144 typically being approximately .045 inch for a valve spring having a free axial dimension of approximately .64 inch. It will be readily apparent, of course, that the end section 144, as well as the entire end plug 138, may be fabricated of various alternative materials such as well known types of deformable synthetic plastic materials or the like, without departing from the scope or fair meaning of the present invention. Also, it will be readily apparent that the end section 144 may be provided by a suitable radially extending disk-shaped member that is not formed integral with the side wall 140 of the end plug 138, but which is instead supported by any suitable well known means at a position adjacent the pressure plate 136, or adjacent the spring 134 itself.

It will be seen from the above described construction that the present invention provides a new and improved valve assembly which is characterized by a feature which permits the use of considerably less expensive valve springs therein, without any reduction in the effectiveness or positive action of the valve, with the result that the entire associated valve assembly may be manufactured at a considerably reduced price as compared with similar type valves heretofore known and used. It is to be noted that the principles of the present invention, and namely, the provision of the deformable means adjacent the end of the valve spring for selectively controlling the effective resilient force exerted thereby on the associated valve member, are not intended to be limited merely to so-called proportioning valves of the type illustrated and described herein. Although said principles of the present invention find particularly useful application in such proportioning valves, such as the valve assembly 10, due to the high degree of reliability and positive action required thereof, the present invention will find equally beneficial application in a wide variety of various other types of valve assemblies, both pneumatic and hydraulic, which commonly employ some type of valve spring, either helical, leaf, conical, etc, in effecting preselected movement of an associated valve member toward or away from an associated valve seat. Thus, the present invention will find universality of application in many types of valve arrangements.

While it will be apparent that the preferred embodiment illustrated herein is well calculated to fulfill the objects above stated, it will be appreciated that the present invention is susceptible to modification, variation and change.

What is claimed is:
1. In combination in a proportioning valve for a vehicle braking system,
   a housing member defining an elongated, generally cylindrically-shaped valve chamber,
   one end of said chamber defining an annular axially outwardly extending section terminating in a radial shoulder and defining an internally threaded surface portion,
   a valve member within said chamber and movable between actuated and deactuated positions,
   an elongated helical coil spring extending longitudinally within said chamber and adapted to resiliently urge said valve member toward one of said positions,
   a closure member for closing one end of said chamber and adapted to control the resilient force exerted by said spring against said valve member,
   said closure member comprising a cylindrical wall section having an intermediate radial shoulder portion, a reduced diameter externally threaded portion at one axial end thereof and a generally disc-shaped section formed integrally of said wall section at the axially opposite end thereof from said reduced diameter portion,
   said externally threaded portion of said closure member being threadably engageable with said internally threaded surface portion of said housing member to a position abuttingly engaging said intermediate shoulder portion on said closure member with said radial shoulder on said one end of said housing member, thereby removably securing said closure member to said housing member,
   said disc-shaped section being deformable beyond its elastic limit from a generally flat configuration to a generally semi-spherical configuration,
   a pressure plate member disposed interjacent said spring member and said disc section of said closure member and having one side thereof engageable with one end of said spring and the opposite side thereof engageable with said surface of said disc-shaped section, and
   means for maintaining said pressure plate member in a generally centralized relationship with respect to said closure member.

References Cited

UNITED STATES PATENTS

| 2,697,599 | 12/1954 | Vandal. | |
| 2,781,778 | 2/1957 | Lisciani | 137—540 |
| 3,159,388 | 12/1964 | Wall. | |
| 3,290,882 | 12/1966 | Oberthur. | |
| 3,403,944 | 10/1968 | Thirion. | |
| 3,228,419 | 1/1966 | Smith et al. | 137—540 |
| 3,439,699 | 4/1969 | Caparone et al. | 137—315 |

TRYGVE M. BLIX, Primary Examiner

J. J. McLAUGHLIN, Jr., Assistant Examiner

U.S. Cl. X.R.

137—315, 540; 188—152; 267—1